United States Patent [19]
Yeung

[11] Patent Number: 5,415,939
[45] Date of Patent: May 16, 1995

[54] LASER MARKABLE POLYTETRAFLUOROETHYLENE TAPE

[75] Inventor: Chor K. Yeung, Langres, France

[73] Assignee: Compagnie Plastic Omnium, Lyons, France

[21] Appl. No.: 67,463

[22] Filed: May 24, 1993

[30] Foreign Application Priority Data

May 26, 1992 [FR] France ................. 92 06427

[51] Int. Cl.$^6$ ............................. B32B 27/06
[52] U.S. Cl. ................... 428/422; 428/906; 428/318.6
[58] Field of Search ............ 428/422, 906, 343, 354

[56] References Cited
U.S. PATENT DOCUMENTS

| | | | |
|---|---|---|---|
| 4,547,424 | 10/1985 | Suzuki | 428/422 |
| 4,598,003 | 7/1986 | Renholts | 428/422 |
| 4,652,528 | 3/1987 | Domkowski | 428/422 |
| 4,808,966 | 2/1989 | Ferlier et al. | 338/214 |
| 4,983,460 | 1/1991 | Balanzat et al. | 428/422 |

FOREIGN PATENT DOCUMENTS 0321091 6/1989 European Pat. Off. .

OTHER PUBLICATIONS

World Patents Index No. JP 92-044912, Abstract, 1 page.

Primary Examiner—George F. Lesmes
Assistant Examiner—Blaine R. Copenheaver
Attorney, Agent, or Firm—Schweitzer Cornman & Gross

[57] ABSTRACT

A preformed, multi-layered laser markable tape adapted to sheath and bond to an electrical cable or the like, said tape including an upper layer of unsintered or sintered polytetrafluoroethylene of a first color and having a density less than 1.0; and a lower layer of a second color of unsintered polytetrafluoroethylene; said lower layer adapted to be cured in situ and bonded in situ to said electrical cable.

5 Claims, 2 Drawing Sheets

LASER MARKABLE POLYTETRAFLUOROETHYLENE TAPE

BACKGROUND OF THE INVENTION

The present invention relates to a polytetrafluoroethylene (PTFE) tape made of at least two layers of polytetrafluoroethylene of different colors, suitable for marking with a laser.

It will be understood that marking with a laser consists in producing writing on the tape by irradiating the tape with the aid of a laser beam, especially a $CO_2$ laser. By appropriately controlling the intensity of the laser beam, perforations are produced in the upper layer of the tape, leaving the color of the underlying layer appearing in the perforated regions, thus forming the desired marking.

Multilayer PTFE tapes suitable for marking with a laser and employed chiefly for sheathing electrical cables are known.

In this case the tape provides an insulation function like traditional PTFE tapes and is capable of receiving written cable identification by marking with a laser.

Known tapes which are suitable for marking with a laser usually comprise a plurality of the very thin layers of cured PTFE between which layers of another fluorinated resin, such as FEP and/or PFA, are arranged, the tape itself being coated with FEP and/or PFA.

The presence of these other fluorinated resins is necessary to permit a satisfactory adhesion of the tape layers to each other and of the tape to the support onto which it is wound, especially an electrical cable.

The manufacture of such a tape comprising a large number of layers requires the use of a complex and costly wet-route process consisting in depositing successive layers of fluorinated resins as a dispersion, the process involving stages of drying and of curing at temperatures above the gelling temperature of PTFE.

The product obtained is therefore particularly costly.

In addition, during the marking with a laser beam, bubbles and blisters are found to form in the tape, which are due to a retention, within the layers of the tape, of the gaseous products of the reaction induced by the irradiation.

SUMMARY OF THE PRESENT INVENTION

The present invention proposes to produce a laser-markable PTFE tape avoiding these disadvantages and additionally capable of being manufactured in a particularly simple and economical manner.

The tape according to the present invention, suitable for laser marking, is made of at least two layers of PTFE of different colors and is characterized essentially by the fact that the lower layer, at least, consists of unsintered PTFE and that the upper layer, at least, has a density lower than 1.0.

Unsintered PTFE is intended to mean PTFE which has never been subjected to a so-called "gelling" or "sintering" temperature, which is of the order of 350° C. i.e. uncured PTFE.

In a preferred embodiment of the invention the tape comprises only two layers of PTFE, namely an upper layer of low relative density, lower than 1.0, of a first color, for example white, made of natural, unsintered or cured PTFE, optionally with the addition of white pigments, and a lower layer of a second color, made of unsintered PTFE filled with colored pigments, for example black pigments.

In another embodiment of the invention the tape comprises three layers of PTFE, namely an upper layer of a first color, for example white, made of natural cured PTFE, optionally with the addition of white pigments, an intermediate layer made of cured PTFE filled with pigments of a second color, for example black pigments, and a lower layer made of unsintered PTFE filled with pigments of a third color differing from the second, especially of red pigments, the upper layer and the intermediate layer having a low density, lower than 1.0.

Control of the intensity of the laser beam makes it possible to pierce the white upper layer selectively, or solely, or the intermediate layer as well, and this permits marking in two different colors corresponding to the color of the intermediate layer and of the lower layer respectively.

Each of the PTFE layers of the tape according to the invention can be produced by the known process of lubricated extrusion which makes it possible to obtain a tape exhibiting completely controlled characteristics, in contrast to wet-route processes such as those used to obtain the known tapes which are suitable for marking with a laser.

It will be understood that the lubricated extrusion process consists in mixing PTFE powder with a lubricant to produce a compact preform which is subjected to extrusion in a press in which a plunger extrudes the PTFE through a die so as to form a section such as flat tape or a cylindrical reed.

This section is then subjected to a calendering operation between two rolls to obtain a thin tape.

The lubricant is then removed, particularly by drying or, if appropriate, with the aid of a solvent.

If desired, the tape thus obtained can be subjected to a stage of dedensifying by drawing, for example, by passing the tape successively over rollers driven at linear peripheral speeds which are in the ratio of the elongation which it is desired to impart to the tape or else by subjecting the tape to the action of a tensioning device which applies to the tape a force corresponding to the deformation which it is desired to impart to it.

If appropriate the drawing of the tape can take place after the latter has been heated.

In a first embodiment of the tape according to the invention the lubricated extrusion process followed by a calendering operation and, if appropriate, a dedensification drawing is applied separately to cylindrical prismatic preforms consisting, in the first case, of natural unsintered PTFE optionally filled with white pigments, the other preform(s) consisting of unsintered PTFE filled with colored pigments.

The different layers intended to make up the tape according to the invention are thus obtained separately in the form of tapes. The layers intended to form the upper layer of the tape and the intermediate layer(s) can subsequently be cured by being subjected for a sufficient time to a temperature which is higher than the sintering temperature.

These different layers thus formed can be combined with or without a binder.

In one variant a finished layer obtained by the lubricated extrusion process described above can be applied onto a layer leaving the calendering rolls and from which the lubricant has not yet been removed.

During the drying following the calendering, a proportion of the lubricant evaporating from the layer which still contains it remains between the two tape layers and forms an intimate adhesive bond between the layers.

In another variant the layers extruded separately are calendered together, the tape formed being subsequently dried to remove the lubricant and, if appropriate, subjected to a dedensification stage.

In another embodiment of the tape according to the invention the lubricated extrusion process followed by a calendering operation and, if appropriate, a dedensification drawing is applied to a composite preform, a cylindrical or prismatic one in particular, which has lengthwise regions consisting of a mixture of unsintered PTFE and lubricant, one of the regions containing natural PTFE, if appropriate filled with white or colored pigments, and the other region(s) containing PTFE filled with colored pigments of different colors.

Thus, for example, to produce a tape with two layers the preform may comprise two semicylindrical regions containing, mixed with a lubricant, in the one case, natural unsintered PTFE optionally filled with white or colored pigments and, in the other case, unsintered PTFE filled with colored pigments of different colors.

To produce such a preform, a semicylindrical mandrel is placed in a cylindrical preform mold, the remaining space in the mold is filled with a first mixture of lubricant and of natural PTFE filled, if appropriate, with white or colored pigments, this mixture is pressed in with the aid of a plunger, after which the mandrel is removed and in the free part of the mold another mixture of lubricant and of PTFE is placed, containing colored pigments of different colors, for example black pigments, and compacting of the two different mixtures present in the mold is carried by pressing in with the aid of the plunger.

To produce preforms comprising more than two mixtures, in order to produce tapes with more than two layers, the abovementioned operations are carried out successively by providing one or, if appropriate, a number of mandrels of appropriate sections.

Besides the colored pigments, the layers of unsintered PTFE of the tape according to the invention may comprise other additives intended to give the tape particular properties, for example carbon black if it is desired to impart an additional antistatic function to the tape.

DESCRIPTION OF THE DRAWINGS

Other advantages and characteristics of the invention will appear on reading the following description, given with reference to the attached drawing, in which.

DETAILED DESCRIPTION OF THE INVENTION

Figure 1A:
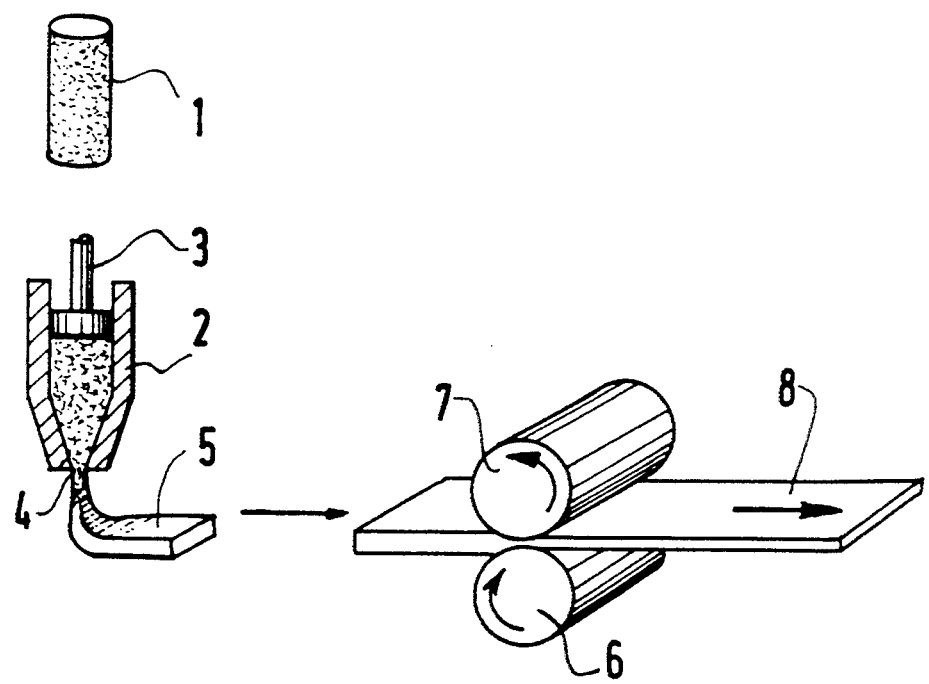
FIGS. 1a and 1b illustrate the different stages of implementation of the lubricated extrusion process to obtain a layer of the tape according to the invention starting with a preform.
Figure 1B:
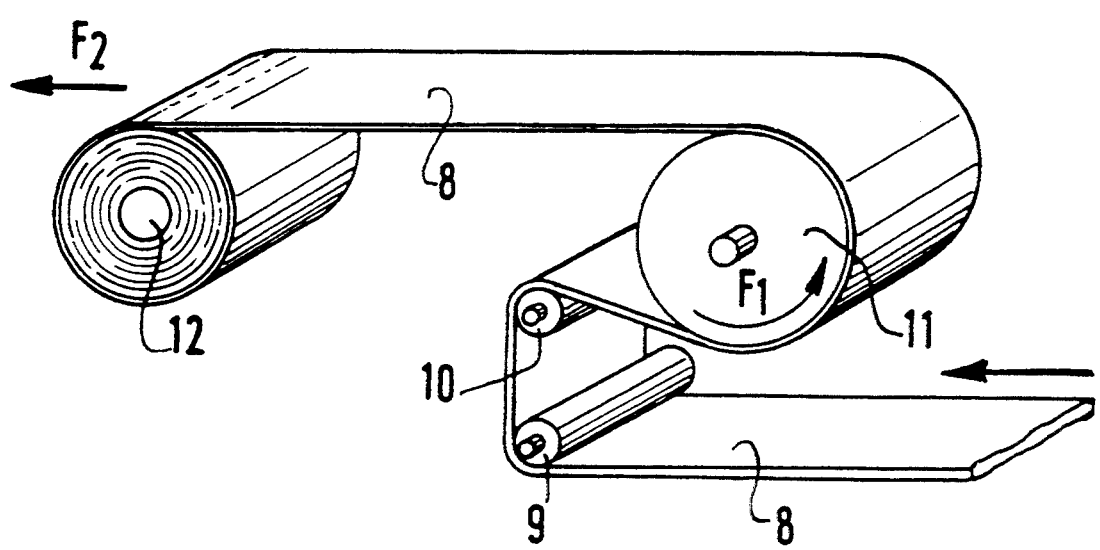

Reference is made first of all to FIGS. 1a and 1b.

FIG. 1a illustrates the stages of lubricated extrusion and of calendering for production of a layer of unsintered PTFE tape, whereas FIG. 1b illustrates the stage, carried out optionally, of dedensification by drawing.

A preform, for example of cylindrical shape, is obtained by compacting a mixture of finely powdered unsintered PTFE and lubricant.

The preform 1 is introduced into an extrusion press 2, where a plunger 3 extrudes the mixture of unsintered PTFE powder and lubricant through a die 4 which, in the example illustrated, is slit-shaped, so as to obtain a flat tape 5. In an alternative form, the die could be circular, so as to obtain a cylindrical reed.

This tape 5 is then taken to pass between two calendering rolls 6 and 7 rotating in opposite directions so as to obtain a thin tape 8.

In a subsequent stage, not illustrated, the tape 8 is dried to remove the lubricant which has been used to promote the extrusion and the calendering. Depending on the lubricant employed, the drying stage may be replaced by passing the tape through a solvent to remove the lubricant.

If the density of the tape 8 thus obtained is still higher than the desired value, a stage of drawing, illustrated in FIG. 1b, is performed.

The tape 8 is taken, by means of return rollers 9, 10 over a drum 11 which is driven in rotation at a constant speed about its axis in the direction of the arrow F1.

If necessary, the drum 11 comprises an internal heating device which makes it possible to keep its periphery at an adjustable constant temperature.

After having wound onto the periphery of the drum 11, the unsintered PTFE tape 8 can be wound onto a core 12 used in combination with a driving device, not shown, arranged so that the tensile force 2 exerted on the tape can be adjusted at will.

In an alternative form, another drum can be provided downstream of the drum 11, driven at a peripheral speed which is higher than the peripheral speed of the drum 11 so as to cause elongation of the tape as soon as it leaves the drum.

The process illustrated in FIGS. 1a and 1b is applied separately to produce each of the layers which are to constitute the tape according to the invention. The tape intended to form the upper layer can then be subjected to a cure.

The combination of the different layers manufactured separately can be performed by one of the methods of implementation set out above.

In an alternative form, the tape according to the invention can be produced directly by lubricated coextrusion. For example, to produce a tape with two layers, a preform 1' illustrated in FIG. 2 and made up of two different mixtures M1 and M2 can be employed instead of the preform 1 illustrated in FIG. 1a. The mixture M1 consists of fine powder of natural unsintered PTFE, if appropriate with the addition of white pigments and of a lubricant, and the layer M2 is a mixture of a fine powder of virgin PTFE with the addition of colored pigments, for example black pigments, and of a lubricant.

The preparation of such a preform is illustrated in FIGS. 3a to 3d.

A cylindrical mold 13 in which a plunger 14 slides is employed is shown in FIGS. 3a–3d.

The upper part of the mold is capable of being selectively closed off by a lid 15 held firmly onto the mold 13 by bearing members 16. A mandrel of semicylindrical shape 17 is placed in the mold and the remainder of the mold cavity is filled with a first mixture M1 and the upper part of the mold is closed off vertically in line with the region containing this mixture M1 with the aid of the lid 15.

Figure 2:
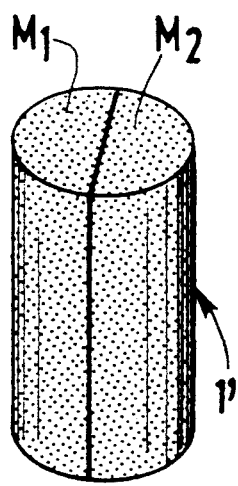
FIG. 2 illustrates a preform for the production of a tape with two layers by lubricated coextrusion.
Figures 3A, 3B:
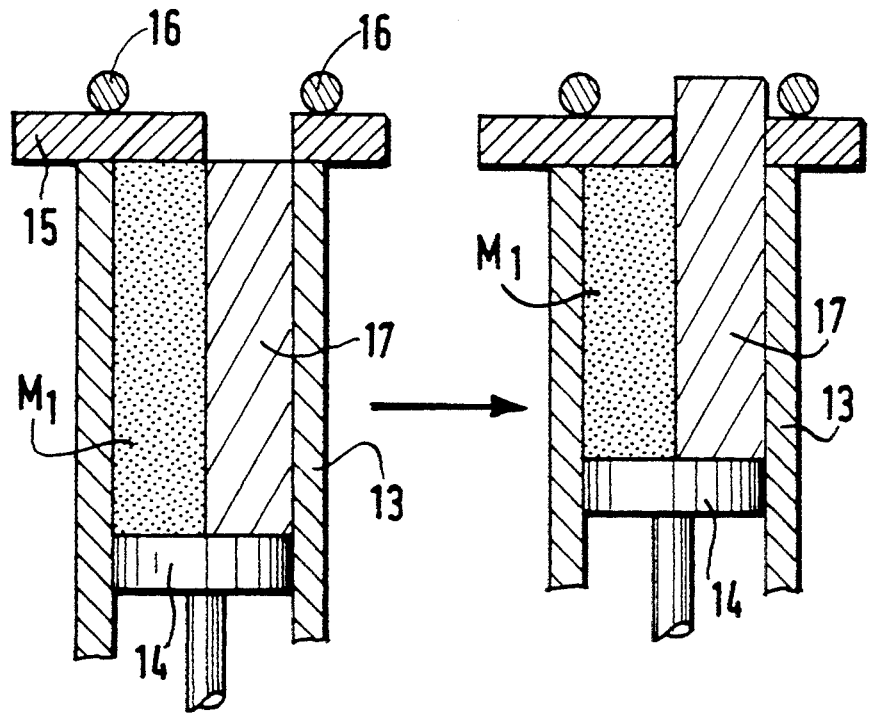
FIGS. 3a to 3d illustrate the stages of production of the preform of FIG. 2.
Figures 3C, 3D:
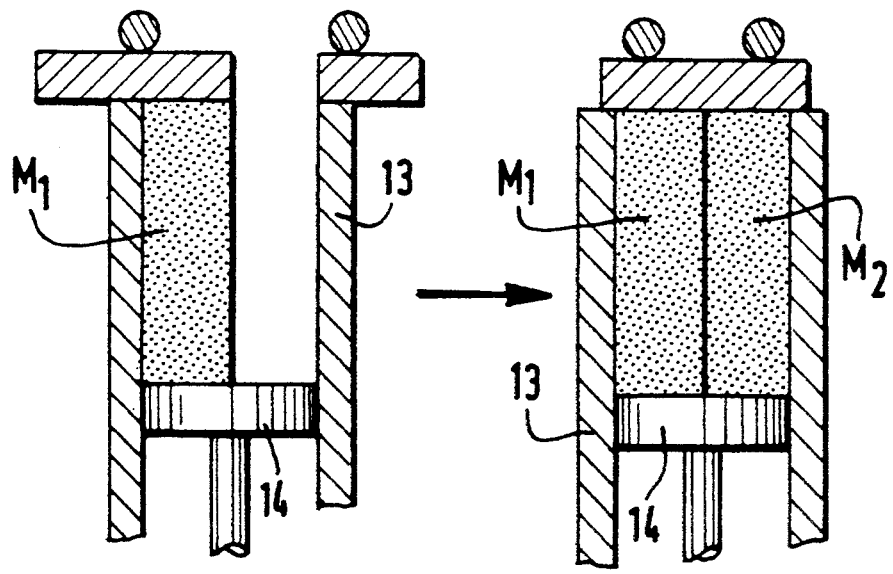

The plunger 14 is actuated so as to press in the mixture M1, after which the mandrel 17 is withdrawn and the free semicylindrical space of the mold is filled with a second mixture M2. After the upper end of the mold has been closed off completely, the plunger 14 is actuated again so as to cause the compacting of the mixtures M1 and M2. After the closure lid has been withdrawn, the preform 1', illustrated in FIG. 2, is obtained, which comprises two semicylindrical lengthwise regions containing the mixtures M1 and M2 respectively. By using a number of mandrels it is possible to produce preforms made up of three or more mixtures, making it possible to produce a tape made up of three or more layers.

Three examples of tapes suitable for marking with a laser according to the invention will be described below.

EXAMPLE 1

The upper layer of the tape made of unsintered PTFE is manufactured by the process illustrated in FIGS. 1a and 1b, the layer obtained having a thickness of 35 $\mu$m and a density of 0.75.

By making use of the process illustrated in FIG. 1a, the lower layer of the tape is produced by using unsintered PTFE filled with black pigments in a proportion of 1% by weight. The dedensification stage illustrated in FIG. 1b is not carried out.

The lower layer has a thickness of 50 $\mu$m and a density of 1.60.

The two layers are combined by pressure.

The twin-layer tape obtained was employed in the preparation of a sheathed cable, the dedensified white layer being arranged on the outside.

After curing of the tape in situ it is found that the outer layer of the tape has a good opacity, the cable appearing white.

Imprints have been successfully made in a satisfactory manner, without bubbles or blisters, by employing a conventional $CO_2$ laser with an energy density of between 8 and 15 $J/cm^2$.

EXAMPLE 2

A tape was produced by coextrusion by first of all producing a preform as illustrated in FIG. 2 using a mixture M1 of unsintered PTFE and lubricant, containing 2% by weight of white pigments, and a mixture M2 of unsintered PTFE and lubricant, containing 2% by weight of black pigments.

After lubricated coextrusion, calendering and drying, a twin-layer tape with a thickness of 75 $\mu$m was obtained.

The white-pigmented upper layer has a thickness of 25 $\mu$m.

This tape was dedensified by drawing so as to reduce its density from 1.58 to 0.80.

This tape has also been found to be very suitable for marking with a laser on a sheathed cable after curing of the tape in situ.

EXAMPLE 3

A two-layer tape was produced by combining a cured expanded natural PTFE tape with a density of 0.5 and a thickness of 30 $\mu$m with a black-pigmented unsintered PTFE tape with a density of 1.65 and a thickness of 50 $\mu$m.

The tape obtained exhibits a very good capability for being marked with a laser.

Although the invention has been described in connection with particular embodiments, it is quite obvious that it is not limited thereto in any way and that it can be subjected to different variants and modifications without departing thereby either from its scope or its concept.

I claim:

1. A roll of preformed, multi-layered laser markable tape adapted to sheath and to bond in situ to an electrical cable, said tape comprising
   (a) an upper layer of unsintered or sintered polytetrafluoroethylene of a first color and having a density less than 1.0 gram/cubic centimeter; and
   (b) a lower layer of a second color different from the first color of unsintered polytetrafluoroethylene;
   (c) said lower layer adapted to be cured in situ and bonded in situ to said electrical cable.

2. The roll of tape of claim 1 wherein
   (a) said upper layer includes white pigments;
   (b) said lower layer includes pigments contrasting in color to said white pigments.

3. The roll of tape of claim 1 wherein
   (a) an intermediate layer of unsintered polytetrafluoroethylene of density less than 1.0 gram/cubic centimeter and having a third color differing from said first and second colors is included between said upper and lower layers.

4. The roll of tape of claim 1 wherein
   (a) said upper and lower layers are produced by lubricated extrusion and calendaring.

5. The roll of tape of claim 4 wherein
   (a) said upper and lower layers are subjected to drawing after having been produced by extrusion and calendaring.

* * * * *